Figure 4:
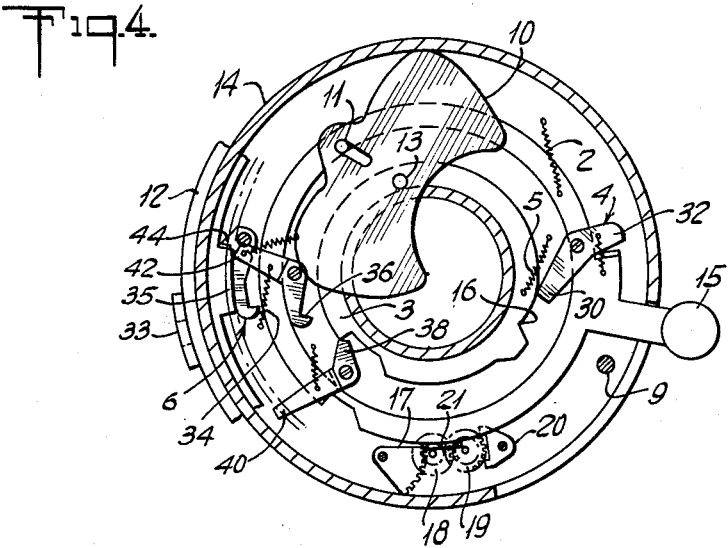

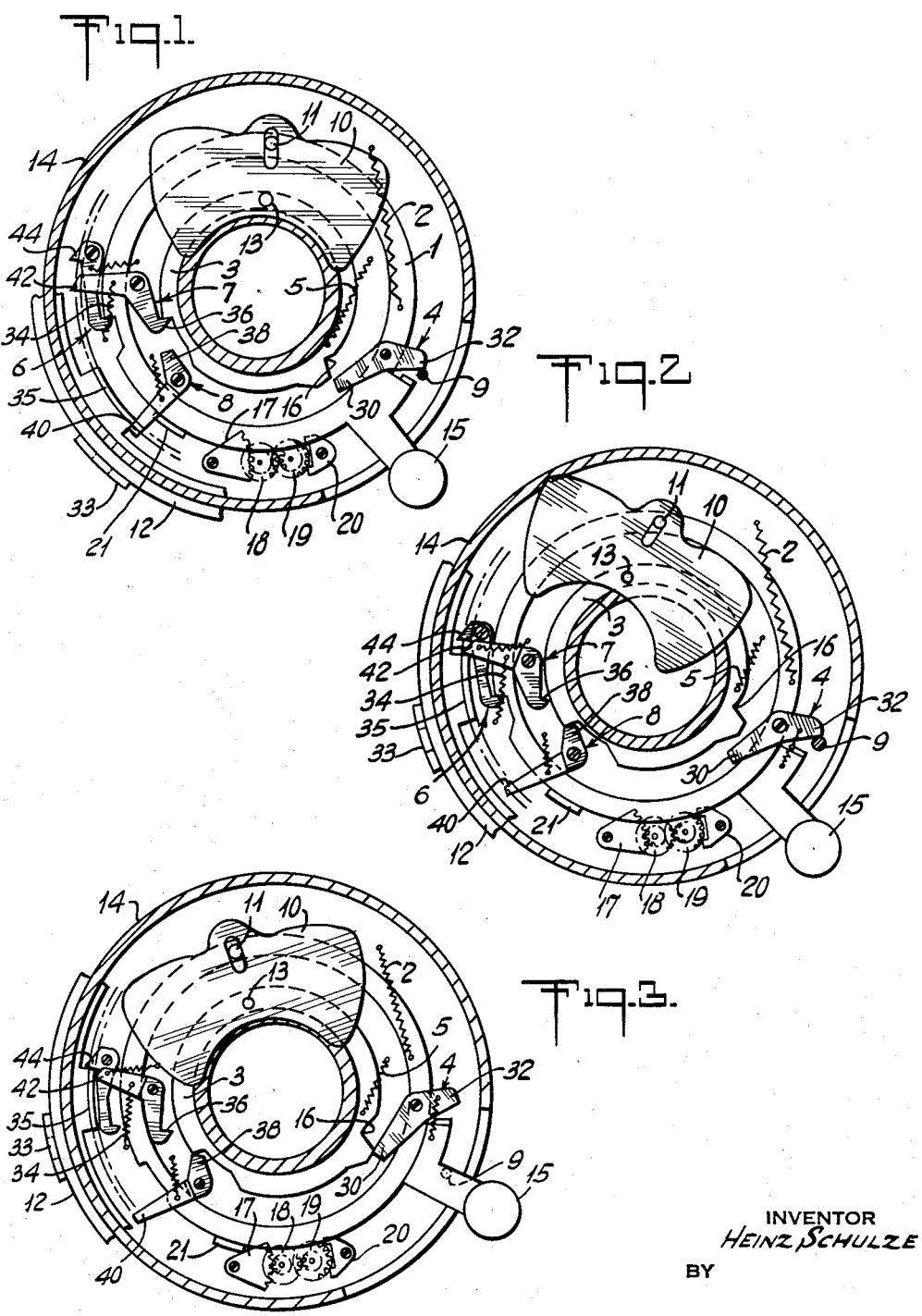

Oct. 24, 1961 — H. SCHULZE — 3,005,394
PHOTOGRAPHIC SHUTTER

Filed Sept. 25, 1956 — 2 Sheets-Sheet 2

INVENTOR
HEINZ SCHULZE
BY
ATTORNEYS

United States Patent Office 3,005,394
Patented Oct. 24, 1961

3,005,394
PHOTOGRAPHIC SHUTTER
Heinz Schulze, Dresden, Germany, assignor to VEB Kamera- und Kinowerke Dresden
Filed Sept. 25, 1956, Ser. No. 612,022
Claims priority, application Germany Sept. 26, 1955
6 Claims. (Cl. 95—63)

This invention relates to photographic shutters and more particularly to camera shutters of the kind which render possible the viewing of the image to be shot, independent of the normal shutter action. Such camera shutters are commonly employed in single-lens reflex cameras, wherein the image entering through the lens and the shutter is deflected by a mirror to the view finder of the camera.

Known additional opening arrangements for photographic lens shutters commonly used in single-lens reflex cameras render it possible to view the image only prior to each shooting, i.e. the blades of the shutter are closed after a completed exposure. This fact entails the drawback that the operator, after completed exposure, has no means for making sure or being certain whether or not the particular image he viewed in the view-finder prior to the exposure has in fact been shot and exposed.

It is an object of this invention to provide a camera shutter suitable for use in, for example, a single-lens reflex camera, which renders it possible to view the image both prior and after each exposure.

A further object of this invention is the provision of a shutter of the kind referred to, which is simple and inexpensive to build and which assures accurate and reliable shutter action.

Moreover, it is an object of this invention generally to improve on photographic shutters as now customarily built.

This, and other objects and structural details will be apparent from the following description when read in conjunction with the accompanying drawing forming part of this specification, wherein—

FIGURE 1 is a somewhat diagrammatical front elevational view of a shutter according to the invention having double-ended blades, the shutter being shown in its tensioned position. FIGS. 2, 3, 4 and 5 illustrate the shutter in FIG. 1 as it passes from its cocked to its uncocked position.

Referring now to FIGURE 2, reference numeral 14 indicates the shutter housing, in which mounting members embodied by a driving ring 1 and a bearing ring 3 are rotatably mounted. The rings 1 and 3 are rotatable in clockwise direction against the action of springs 2 and 5, respectively. The blades 10 of the shutter are pivotally mounted on the rings 1 and 3 by means of pins or the like, 11 and 13, respectively. In order not to overcrowd the drawing, only one blade 10 has been illustrated. As will be observed, the mounting of the blade 10 on the ring 1 is a pin-and-slot connection, so as to permit displacement of the blades relative to the ring 1, when the blades are rocked about the pivots 13 on ring 3.

The blades are of the known double-ended type, wherein the opening and closing cycle is effected by one continuous action, that is: when the opening edge of the blades uncovers the aperture, the trailing edge closes it.

The mounting means or driving ring 1 is actuated, i.e. rotated by means of a handle or grip 15 projecting beyond the confines of the shutter housing 14, so as to be easily accessible.

A two-armed driving means or driving lever 4 is rockably mounted on the driving ring 1. This lever 4 renders it possible jointly to tension the driving ring 1 and the bearing ring 3. The joint tensioning of the two rings 1 and 3 is carried out as follows: The handle 15 of the driving ring 1 is moved in clockwise manner, so that the driving ring 1 is rotated against the action of spring 2. The driving lever 4 engages with its arm 30 in the notch 16 of the bearing ring 3, whereby the latter is carried along by and thus follows the movement of the ring 1 against the action of spring 5. The joint movement of the two rings 1 and 3 is interrupted when the position is reached wherein the arm 32 of the lever 4 abuts against the stationarily arranged stop 9. When the arm 32 thus abuts against the stop 9, the lever 4 is rocked about its pivot on the driving ring 1, whereby the arm 30 of the lever 4 is disengaged from the notch 16.

Holding means are provided for arresting the rings 1 and 3 in their tensioned or cocked position. These holding means comprise spring-loaded, two-armed levers 6 and 7, rockably mounted on the shutter casing 14, which levers respectively engage in notches 34 and 36 of the rings 1 and 3. A spring-loaded, two-armed catching element or lever 8 is also rockably mounted on the shutter housing 14. This lever 8 serves the purpose of interrupting with its arm 38 in cooperation with notch 36, the counter-clockwise return movement of the bearing ring 3 upon release of the shutter as soon as the blades 10 have covered the shutter aperture.

The sequence of the shutter action upon its release is controlled by a control element 12. The element 12 operatively engages a movable film cover plate so as to clear the film portion to be exposed after the lens aperture has been closed by the relative movement of rings 3 and 1 and to again cover the film portion prior to opening of the lens aperture by relative movement of the rings. The film cover plate and the control element 12 are manually operated by the person taking the picture. The concept of manually operating a film control element is, of course, old in the art. A coupling between a shutter control element and a film cover plate for mutual manual operation is well known in the art. This element 12 is operated by the camera mechanism and is preferably operatively associated with the film cover plate or mirror.

The operation of the shutter here illustrated is as follows: The shutter is first tensioned in the manner described, whereafter the shutter elements are in the position shown in the figure. The controlling element 12 is operatively connected with a camera mechanism (not shown) in a conventional manner so that upon actuation of this mechanism this controlling element 12 is moved in clockwise direction. As can be seen in FIG. 2, the arm 42 of the lever 7 and the arm 44 of the arresting lever 6 project into the rotary path of flange 35 of controlling element 12. Upon release of the camera mechanism (not shown), the controlling element 12 thus strikes against the arm 42 of the lever 7, whereby the latter is rocked about its pivot and disengaged from the notch 36 of the bearing ring 3. The bearing ring 3 thus released is urged by a spring 5 to rotate in a counter-clockwise direction until notch 36 strikes end 38 of lever 8. The blades 10 are thus rocked clockwise about their pivot points sufficiently to close the shutter aperture with one of their ends (the right-hand end of the blade shown in FIG. 2). The movement of the bearing ring is stopped by the arm of the lever 8, i.e. the arm 38 engages in the notch 36, as soon as the aperture has been closed by the blades 10. The controlling element 12 meanwhile continues its clockwise movement while the film cover plate is swung out of the range of the image to be shot. The controlling element 12 thereafter comes to bear on the arm 44 of the lever 6, whereby the latter is rocked about its pivot and releases the driving ring 1, i.e. the notch 34 is disengaged. The released driving ring 1 is now urged by its spring 2 to move in counterclockwise direction thereby causing the opening and subsequent closing of the shutter aperture by the blades 10 rotating counter-clockwise.

This step of the shutter action, i.e. the opening and closing of the blades causes the exposure of the film, which now occurs without being obstructed since the film cover plate has been already swung out of the range of the light rays. The shutter speed may, of course, be set in known manner by the provision of the speed selecting or retard mechanism diagrammatically indicated by elements 17—20. In the embodiment here illustrated, this mechanism 17—20 is actuated by the driving lug 21 arranged on the driving ring 1, the counter-clockwise release movement of which ring 1 is thus retarded by the mechanism 17—20 in known manner.

After completed exposure, i.e. when the shutter blades are closed again, the camera mechanism (not shown) causes the return movement of the controlling element 12 in counter-clockwise direction, whereby the film cover plate is swung back into the range of the light rays or image. The controlling element 12 during its return movement strikes against the arm 40 of the catching lever 8. This in turn causes a rocking movement of the catching lever 8 about its pivot, whereby the bearing ring 3 is released, i.e. the arm 38 is disengaged from the notch 36. The bearing ring 3 thus returns under the action of its spring 5 into its rest position. This in turn results in the fact that the blades clear again the shutter aperture, so that the image, which was visible in the view finder before exposure and which has just been shot is again visible in the view finder of the camera.

FIG. 1 shows the shutter energized and opened.

FIG. 2 shows the flange 35 operated by an operator whereby the inner ring 3 is operated and the blade 10 is placed in the path of light coming through the aperture. The inner ring 3 engages the lever 8.

FIG. 3 shows the flange 35 engaging the lever 6 which releases the outer ring 1 and opens the shutter by moving the blade 10 in a counter clockwise direction about its pivot 13. The outer ring 1 has its flange 21 contact the speed-selecting mechanism 17, 18, 19 and 20 so that the automatic regulation of the exposure time results.

FIG. 4. The outer ring has passed the speed regulating elements 17, 18, 19 and 20 and the blades 10 are again moved into the path of the light coming into the aperture. At this point the shutter cycle has ended.

Figure 5:
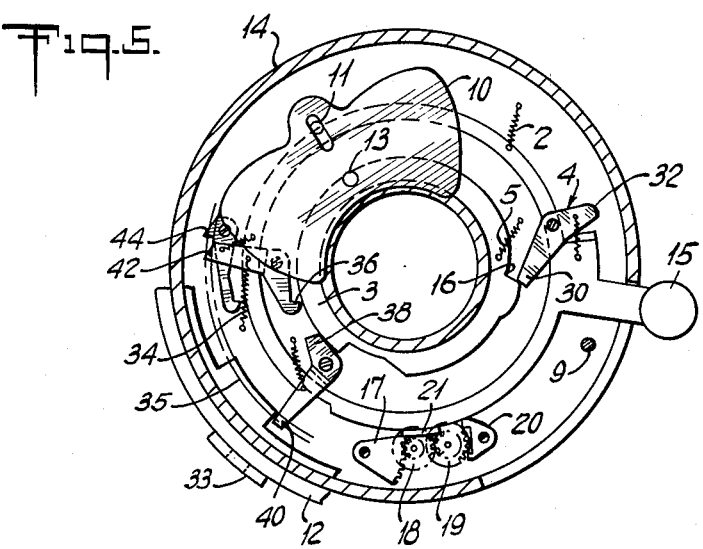

FIG. 5. To again allow viewing, the element 12 is returned to its viewing condition and the lever 8 is released so that the inner ring can return to its unenergized condition. In this manner the blades are again pivotally returned to an open condition.

It will be realized that the inventive arrangement is not limited to the construction here shown. Further, it is of course also possible to adapt the arrangement to shutters of the common oscillating blade type. In such case, the arrangement should include means for moving the driving ring and the bearing ring relative to each other so as to effect in this way the reversing sequence of closing and opening of the shutter aperture.

In case the arrangement is to be used in shutters wherein the oscillations of the blades are effected through reversing means, for example through crank drives, by driving means acting in one direction only, then these driving means, which likewise may advantageously be constructed as rings, may be controlled in a manner analogous to the embodiment here shown.

From the above description it will be realized that the blades of a shutter constructed in accordance with this invention are advantageously mounted on two mounting means as embodied by the ring members. For the purpose of effecting an exposure, one of these ring members—the driving ring—is rotated so as to cause the opening and closing of the shutter aperture by the blades, while the second ring member—the bearing ring—causes the blades to close the aperture prior to each exposure and to open the aperture subsequent to each exposure. Thus, since the shutter aperture is uncovered subsequent to each exposure, the operator has the advantageous possibility of once more viewing in the view finder the image he has just shot, so that he can make sure after each exposure that he shot the correct object.

In accordance with the preferred embodiment of the inventive shutter as illustrated in the drawings, both the driving ring and the bearing ring are fitted with their own force storage means, for example springs, whereby the alternate closing and opening of the shutter aperture by the blades is effected in automatic manner.

Further, in accordance with the preferred embodiment, the shutter action of the inventive shutter is controlled by the controlling element which is operatively associated with the film cover plate or mirror, which is usually provided in the camera. In this manner a construction is obtained which also assures that—during the normal exposure procedure—no harmful and film-spoiling light reaches the film. The force storage means, catching elements, and controlling element thus constitute controlling means for controlling the operation of the shutter action.

Furthermore, the rings are preferably constructed and arranged in or on the shutter housing in such manner that the tensioning of one of the ring members causes the simultaneous tensioning of the other one. This construction, i.e. the simultaneous tensioning of both ring members attains particular importance in case the tensioning of the shutter is to be effected jointly with the film advance and/or, if desired, with other functions fo the camera.

I have described a preferred embodiment of my invention, but it is understood that this disclosure is for the purpose of illustration rather than for the purpose of limitation, and that various omissions or changes in shape, proportion and arrangement of parts, as well as the substitution of equivalent elements for those herein shown and described may be made without departing from the spirit and scope of this invention as set forth in the appended claims.

What I claim is:

1. In a shutter the combination of: a shutter housing having an aperture, a plurality of double-ended blades, a first ring rotatably mounted on said housing, a second ring rotatably mounted on said housing, each of said blades being in pivotal engagement with said first and second rings, at least one of said pivotal engagements comprising a pin-and-slot engagement, said first and second rings being rotatable between a tensioned position and a released position, first spring means urging said first ring into its released position, second spring means urging said second ring into its released position, a first holding member rockably mounted on said housing for holding said first ring in its tensioned position, a second holding member rockably mounted on said housing for holding said second ring in its tensioned position, a catching element rockably mounted on said housing, and a controlling element, said first ring upon movement from its tensioned position into its released position rocking said blades about the pivots on the first and second rings so as to move into and out of said aperture, whereby an exposure is effected, said second ring upon movement from its tensioned to its released position rocking said blades about the pivots on the first and second rings so as to move into said aperture prior to moving out of said aperture by the blades rocked by the movement of said first ring and to open said aperture subsequent to movement into said aperture by the blades rocked by the movement of said ring, said controlling element upon actuation first rocking said second holding member out of engagement with said second ring, whereby said second ring is urged by said second spring means towards the released position and rocks said blades so as to move into said aperture, said catching element being positioned on said shutter or housing so as to engage said second ring and thus to interrupt its movement toward the released position upon the closure of said aperture, said controlling element thereafter rocking said first holding member out of engagement with said first ring, whereby said first ring is urged by said first spring means into its released position and rocks said blades so as first to move into and thereafter to move out of said aperture, and said controlling element thereafter rocking said catching element out of engagement with said second ring, whereby said second spring means urges said second ring into its released position and said blades are rocked so as to move out of said aperture.

2. In a shutter as claimed in claim 1, said first and second rings being coaxially mounted, a driving member mounted on one of said first and second rings, and a stop, said driving member being engaged with the other ring during the movement of the ring on which the driving member is mounted from the released to the tensioned position so as to take along said other ring, whereby said two rings are simultaneously tensioned, and said driving member striking against said stop in the tensioned position, whereby said driving member is rocked out of engagement with the other ring.

3. A shutter for an objective lens on a camera, comprising a rotatable driving ring coaxial with the lens, a rotatable bearing ring coaxial with the lens, light-controlling shutter blade means hinged to both of said rings for closing the lens by movement into the lens axis and for opening the lens by movement out of the lens axis in response to rotation of one ring relative to the other, ring biasing means for urging each of said rings in one direction into a predetermined angular position relative to the other, shutter cocking means for rotating both of said rings against the urging of said biasing means and into an energized position where the shutter is opened, a releasable bearing ring catch mounted on the camera for retaining said bearing ring in the energized position, a releasable driving ring catch for retaining said driving ring in the energized position, reciprocable release means on said camera selectively movable by an operator of the camera along a predetermined path intersecting said catches for first releasing said bearing ring catch to permit rotation of said bearing ring relative to said driving ring whereby said blade means are moved to a closed shutter position, releasable stop means in the return path of said release means for catching said bearing ring after a predetermined angle of rotation thereof which corresponds to the closed position of said blade means when said driving ring is retained in the energized position, said release means upon further movement in the predetermined path then releasing said driving ring catch to permit rotation of said driving ring relative to the stopped bearing ring to a predetermined angle whereby said blade means are opened and closed, said releasable stop means being released when said release means are returned along the predetermined path to an initial position after said driving ring has closed said blade means.

4. A shutter for an objective lens on a camera comprising a rotatable driving ring coaxial with the lens, a rotatable bearing ring coaxial with the lens, light-controlling shutter blade means hinged to both of said rings for movement into and out of the lens axis in response to the rotation of one ring relative to the other to respectively close and open the shutter, ring biasing means for urging each of said rings in one direction into a predetermined relative position, shutter cocking means for rotation of said rings against the action of said biasing means and from an open unenergized position into an energized position where the blade means are opened to allow passage of light, a releasable bearing ring catch for retaining said bearing ring in the energized position, a releasable driving ring catch for retaining said driving ring in the energized position, reciprocatable release means movable by an operator of the camera in a predetermined path intersecting said catches for first releasing said bearing ring catch to enable rotation of said bearing ring relative to said driving ring whereby said blade means are moved, releasable stop means in the return path of said release means for catching said bearing ring after a predetermined angle of rotation which corresponds to the closed position of said blade means when said driving ring is retained in the energized position, said release means upon movement in the predetermined path then releasing said driving ring catch to permit rotation of said driving ring relative to the stopped bearing ring to a predetermined angle whereby said blade means are first opened and then closed, said releasable stop means being released when said release means are returned along the predetermined path to an initial position after said driving ring has closed said blade means, whereby said blade means are opened.

5. A shutter for an objective lens on a camera, comprising a rotatable driving ring coaxial with the lens, a rotatable bearing ring coaxial with the lens, a plurality of peripherally arranged light-controlling shutter blades each being hinged to both of said rings for movement into and out of the lens axis in response to the movement of one ring relative to the other, ring biasing means for urging each of said rings in one direction toward an unenergized position in which the rings are so positioned relative to the other as to open the shutter, shutter cocking means for rotation of said rings against the urging of said biasing means from an unenergized open position into an energized open position whereby said shutter blades are moved out of the lens axis, a releasable bearing ring catch for retaining said bearing ring in the energized position, a releasable driving ring catch for retaining said driving ring in the energized position, reciprocable release means movable by an operator of the camera in a predetermined path intersecting said catches for first releasing said bearing catch to permit rotation of said bearing ring relative to said driving ring whereby said blade means are moved toward a closed position, releasable stop means in the return path of said release means for catching said rotating bearing ring at the predetermined angle of rotation which corresponds to the closed position of said blade means when said driving ring is retained in the energized position, said release means upon movement in the predetermined path then releasing said driving ring catch to permit rotation of said driving ring relative to the stopped bearing ring to a predetermined angle whereby the blades are moved out of and back into the lens axis, and retarding means for controlling the speed at which the driving ring passes from the energized to the unenergized position.

6. A shutter for an objective lens on a camera comprising a rotatable driving ring coaxial with the lens, a rotatable bearing ring coaxial with the lens, a plurality of peripherally arranged light-controlling shutter sectors each being hinged to both of said rings for movement into and out of the lens axis in response to movement of one ring relative to the other, whereby the shutter is opened and closed, ring biasing means for urging each of said rings in one direction, limit means for stopping the rotation of the rings and holding the rings so that the shutter is open, shutter cocking means for rotation of said rings against the urging of said biasing means and into an energized position where the blades are out of the lens axis and the shutter is opened, a releasable bearing ring catch for retaining said bearing ring in an energized position, a releasable driving ring catch for retaining said driving ring in the energized position, reciprocable release means movable by an operator of the camera along a predetermined path intersecting said catches for first releasing said bearing ring catch to permit rotation of said bearing ring relative to said driving ring whereby said blades are moved into the lens axis and said shutter is closed, releasable stop means in the return path of said release means for catching said rotating bearing ring after a predetermined angle of rotation which corresponds to the position of the blades in the path of the lens axis to close the shutter when said driving ring is retained in the energized position, said release means upon movement in the predetermined path then releasing said driving ring catch to permit rotation of said driving ring relative to the stopped bearing ring through a predetermined angle whereby said blades are moved out of and then into the lens axis, said releasable stop means being released when said release means are returned along their predetermined path to an initial position after said driving ring has moved said blade means into the lens axis and closed the shutter whereby the blade means are moved out of the lens axis and the shutter is opened, and an escapement for retarding movement of said driving ring.

References Cited in the file of this patent

UNITED STATES PATENTS

| | | |
|---|---|---|
| 2,351,932 | Deckel et al. | June 20, 1944 |
| 2,625,088 | Fuerst | Jan. 13, 1953 |
| 2,862,431 | Noack et al. | Dec. 2, 1958 |

FOREIGN PATENTS

| | | |
|---|---|---|
| 726,693 | Germany | Oct. 19, 1942 |